United States Patent Office.

JOHN ALLCOCK JONES, OF MIDDLESBOROUGH, ENGLAND.

Letters Patent No. 81,908, dated September 8, 1868.

IMPROVEMENT IN THE MANUFACTURE OF IRON AND STEEL.

The Schedule referred to in these Letters Patent and making part of the same.

This invention relates to certain Improvements in the Production of Iron and Steel from cast or refined iron, and consists—

Firstly, in the melting of cast iron or refined iron in a cupola or air-furnace, or other furnace, and from thence running the fluid metal into a puddling-furnace; or, in place of melting the cast iron or refined iron in a separate furnace, it may be melted in the puddling-furnace. It is there puddled for a short time, after which the furnace is reduced to a lower temperature, which may be effected by lowering the damper, when a flux or purifying-agents are added, such as oxide of manganese, salt, nitrate of soda, or sal-ammoniac, and these, or any of them, are well incorporated with the fluid metal. The inside of the puddling-furnace I prefer to line or "fettle" with oxides of iron, as free from sulphur and phosphorus as possible, such fettling-materials being hematite ore, Swedish iron, stone, mill or tap-cinder. This fettling likewise materially assists in cleansing the iron of some of its impurities, such as sulphur and phosphorus. After the iron has been puddled for a short period, the damper is raised, and a higher temperature is applied, so as to enable the separation of the cinder or slag from the crude iron. The crude iron will, as the operation continues, settle to the bottom of the furnace in the form of a pasty mass. As much of the cinder or slag as will run is then tapped off, and incorporated with the cinder will be found many of the impurities originally existing in the pig-iron, such as phosphorus and other substances, the presence of which would be detrimental to the quality of steel. The crude iron or metal now remaining on the bottom of the furnace is removed, and may be squeezed or pressed or hammered, so as to remove a portion of the cinder which may be mixed with it; the crude iron, at this stage, containing more carbon than wrought iron, so much as to render it difficult or impossible to hammer or roll, and it may then be plunged into water if it should be desirable. It is now in a stage fit to be melted into steel.

Secondly, it relates to certain improvements in the production of iron and steel from cast or refined iron, by which iron may be cleansed of impurities, such as sulphur and phosphorus, and obtained in such a state that it may, when removed from the operating-furnace, be melted into steel, or balled up, and hammered and rolled into bars, without the necessity of being submitted to a puddling process. The inside of the operating-furnace I line or "fettle," as in the firstly-described process, with oxides of iron, free from sulphur and phosphorus as is possible, with a low percentage of silica and large proportion of iron, viz, sixty per cent. and above. The metal having been run in and poured upon the hearth of the operating-furnace, or placed cold in the operating-furnace, and allowed to melt there, a high temperature is applied, and the metal brought to a thin and liquid condition. The damper may now be lowered, and the temperature of the furnace reduced, and the mass allowed to thicken. A small quantity of oxide of manganese, salt, nitrate of soda, and sal-ammoniac, may at this stage be added to the thickening mass as a flux and purifier, and should be incorporated with the metal by stirring. The damper may now be raised, and more heat applied, until the iron settles to the bottom in a sticky mass, and the liquid cinder swims on the surface. The cinder is now tapped off the iron, and the latter is raised from the bottom of the furnace, and plunged hot into water, or pressed, to remove a portion of its cinder, or otherwise manipulated, as may be desired. The crude iron, thus obtained, may be melted into steel, or it may be allowed to continue longer in the furnace, and thus to relieve itself of more of its carbon, and then be balled up, and hammered and rolled into wrought iron in the usual way. When the crude iron is removed from the operating-furnace, for the purpose of being melted into steel, it will contain about one per cent. of carbon, and the longer it is in the operating-furnace the less carbon it will contain; but I prefer it to contain about one per cent. for the melting into steel.

In order to effect the conversion of the crude iron or metal resulting from either of the before-described processes into steel, I proceed as follows:

I first heat the crude iron or metal referred to, to a red or white heat, and introduce it by degrees to the hearth of a steel-furnace, such, for example, as a Siemens furnace, as at present constructed, for melting steel upon the open hearth. I first place a little blast-furnace or other slag on the hearth of the furnace, to form a bath, into which the first few loads of the material are placed; or, instead of employing slag for the above-described bath, cast iron may be used, or it may not be always necessary to use a bath of any kind. When the first load is melted, I add another, until the furnace is sufficiently charged. During the operation of melting, a cinder or slag will rise to the surface, which may be tapped off during the operation, thus allowing the flame to come in closer contact with the melted metal.

The crude iron or metal will, during the operation of melting, lose a portion of its carbon, but as each load is added to the melted mass, there will be added a further supply of carbon, and as the crude iron or metal contains about one per cent. of carbon, although I do not confine myself, in the preparation of the crude metal, to that exact quantity, there will be sufficient carbon to keep the mass in a melted state, and to leave it, at the latter end of the operation, with carbon slightly less than what is required to form, with iron, serviceable cast steel. If, however, it should be apparent that more carbon is required than the crude iron or metal will supply, it may be added in the form of and by means of cast iron; and, on the other hand, if there is in the melted steel too much carbon, the proportion may be reduced by adding to the melted mass scrap or wrought iron. When the furnace has been fully charged, and it has been ascertained that the steel is melted, and of the required temper, I add at that stage a small quantity of *spiegel eisen*, not exceeding five per cent. of the melted steel. The steel being now ready, it is tapped into a ladle or preparatory receptacle, and thence into moulds, in manner similar to that in which Bessemer steel is run, or it may be run into moulds direct.

*Claims.*

1. The production of iron and steel from cast or refined iron, by first melting and puddling the same, adding thereto purifying-agents or fluxes, then separating as much of the slag as it is practicable to separate therefrom, and removing the crude iron or metal resulting to furnaces or crucibles, and melting the same, as hereinbefore described.

2. The preparing the crude iron or metal without the employment of a puddling process, and melting the same into steel, as hereinbefore described.

3. The conversion of cast iron into malleable iron without the employment of the puddling process, by allowing the metal to remain for a sufficient period in the puddling or other furnace, as hereinbefore described.

4. The employment of a bath, consisting of slag or cinder, in which the crude iron resulting from the processes before referred to is melted, so as to be converted into steel, as hereinbefore described.

5. The subjecting the crude iron resulting from either of the processes hereinbefore described to pressure, so as to separate a portion of the cinder or slag therefrom, prior to its being placed in or upon the steel-melting hearth or furnace.

In testimony whereof, I have signed my name to this specification in the presence of two subscribing witnesses.

J. A. JONES.

Witnesses:
   R. DOUGLAS,
   JOS. CLEUGH.